United States Patent Office 3,259,663
Patented July 5, 1966

3,259,663
DEHALOGENATION OF ORGANIC COMPOUNDS
Royston Henry Bennett and William Hopkin, Avonmouth, England, assignors to The National Smelting Company Limited, London, England
No Drawing. Filed July 2, 1963, Ser. No. 292,489
Claims priority, application Great Britain, July 3, 1962, 25,415/62
19 Claims. (Cl. 260—650)

This invention relates to the dehalogenation of flourine-containing highly halogenated, e.g., perhalogenated, hydrocarbons to give fluorinated olefinic and aromatic compounds, i.e., compounds with "double-bond" unsaturation. That term where used herein is intended to cover aromatic compounds.

The process may be applied to the dehalogenation of aliphatic chlorofluorocarbons and chlorofluorohydrocarbons to give highly fluorinated olefins, but is of particular value for the preparation of highly fluorinated aromatic compounds such as hexafluorobenzene, pentafluorobenzene, chloropentafluorobenzene and octafluoronaphthalene by the dechlorination, defluorination or dechlorofluorination of appropriate cyclic alkanes, alkenes or alkadienes containing rings of six carbon atoms.

The invention consists in a process for the preparation of a highly fluorinated olefinic or aromatic compound in which a fluorine-containing highly halogenated organic compound is dehalogenated in the vapour-phase by contact with at least one solid metal fluoride, which is capable of acting as a strong reducing agent, at a temperature in the range 200° C.–700° C. A preferred temperature range is from 300° C. to 600° C., and preferred fluorides are chromous fluoride ($CrF_2$) or ferrous fluoride ($FeF_2$).

In one form of the invention highly fluorinated aliphatic olefins may be prepared by the preferential removal of chlorine from the corresponding chlorofluorocarbons or chlorofluorohydrocarbons. Suitable starting materials are 1,1,2-trichlorotrifluoroethane and 1,2-dichloro-1,1,2-trifluoroethane which may be dechlorinated at temperatures between 300° C. and 400° C.

In another form of the invention, chlorofluorocyclohexanes, chlorofluorocyclohexenes, and chlorofluorocyclohexadienes, all containing not more than one chlorine atom attached to each carbon atom may be dehalogenated. These give chlorofluorocyclohexenes, -hexadienes and -benzenes depending on the starting material and degree of dehalogenation. In particular, chlorofluorocyclohexanes containing from one to six chlorine atoms may be dehalogenated to give highly fluorinated chlorofluorobenzenes.

The invention further consists of a process for the preparation of highly fluorinated benzenes by the defluorination of highly fluorinated cyclohexenes and hexadienes containing vinylic hydrogen atoms only. Compounds containing other types of hydrogen atoms may undergo dehydrofluorination concurrently with defluorination. The ease of defluorination increases as the degree of unsaturation increases so that the preferred starting materials for tetrafluorobenzenes and pentafluorobenzene are the hexa-fluorocyclohexa-1:4 and 1:3 dienes containing vinylic hydrogen atoms only; and the heptafluorocyclohexa-1:4 and 1:3 dienes containing vinylic hydrogen atoms only, respectively. The octafluorocyclohexa-1:4 and 1:3 dienes are perferred for preparing hexafluorobenzene.

The invention still further consists of a process for the preparation of perfluorinated aromatic hydrocarbons by the defluorination of perfluorocycloalkanes containing six-membered rings, with or without perfluoroalkyl groups. The ease of defluorination increases as the degree of substitution in the six-membered rings increases so that this is a preferred method for the preparation of the lower perfluoroalkyl benzenes from the corresponding perfluoroalkylcyclohexanes and for the preparation of perfluoronaphthalene from perfluorodecahydronaphthalene.

As an extension of the above form of the invention, perfluoroethylbenzene may be defluorinated to give octafluorostyrene.

Fluorides such as those given above are solid at the temperatures used in this process and may be employed either in the form of powder or aggregates. Fluorides such as stannous fluoride, which are liquid at the temperatures used in this process, are found to be relatively unreactive, presumably because of the very small surface in contact with the organic compounds. Such fluorides are suitable however for a modification of the invention, i.e., for carrying out very easy dehalogenations such as the defluorination of highly fluorinated cyclohexadienes.

The invention still further consists in a process for the preparation of the highly fluorinated olefinic or aromatic compounds as described in any of the preceding paragraphs, in combination with a regeneration of the metal fluoride by reduction with hydrogen.

Though in many cases the regeneration procedure could be carried out simultaneously with the dehalogenation reactions, it is preferred to perform this subsequently to dehalogenation in order to avoid side reactions, such as the substitution of organically bound halogen by hydrogen, and also to enable the optimum conditions to be used for this regeneration. In general, flow systems using hydrogen gas at 400° C. to 700° C. will be found to be suitable.

In addition, where the lower metal fluoride has been used for dechlorination or dechlorofluorination, the reduction stage may be preceded by, accompanied with or followed by treatment with hydrogen fluoride to eliminate chlorine as hydrogen chloride.

The invention still further consists of the highly fluorinated aromatic and olefinic compounds whenever prepared by the process described above.

The process according to the invention is an atlernative to known methods for dehalogenation in which the highly halogenated organic compound is passed over heated metal surfaces. It has the advantage that because of the greater availability of the dehalogenating agent (due in most cases to the larger available surface) a much larger weight of organic compound may be treated by a given weight of reagent than when metal surfaces are used. This means that regeneration has to be carried out less frequently than with a metal dehalogenating agent.

The fluorinated aromatic compounds which may be prepared by the method of the invention are useful heat and nuclear-radiation stable liquids which may be used as, for example, coolants and working fluids in heat engines and coolants for nuclear reactors.

The invention will be further described with reference to the accompanying examples which are not intended to limit the scope of the process over that defined in the appended claims.

In Examples 1–3 (Table 1), the organic compound was passed as a vapour entrained in a stream of nitrogen over 225 ml. of chromous fluoride pellets in a copper reactor. The products were collected in cold traps and analysed by gas liquid chromatography and infra-red spectroscopy.

In Examples 4–11 (Table 2), the organic compound was passed as a vapour entrained in nitrogen over ferrous fluoride pellets in a pyrex glass reactor. The products were collected and analysed as for Examples 1–3.

TABLE 1.—DEHALOGENATIONS OVER CHROMOUS FLUORIDE

| Ex. No. | Compound Dehalogenated | Wt. in (g.) | Temp. (° C.) | Contact Time (mins.) | Wt. Products (g.) | | | | | | |
|---|---|---|---|---|---|---|---|---|---|---|---|
| | | | | | Starting Materials | $C_6F_6$ | $C_6HF_5$ | $CF_3.C_6F_5$ | $C_2ClF_3$ | Unidentified Compounds | Total |
| 1 | Octafluorocyclohexa-1:3 diene | 4.8 | 300 | 11 | [1] 2.2 | 1.9 | 0.1 | | | | 4.2 |
| 2 | Perfluoromethylcyclohexane | 6.2 | 445 | 10½ | 3.1 | | | 1.2 | | | 4.3 |
| 3 | $CCl_2F.CClF_2$ | 7.7 | 400 | 5 | 3.2 | | | | 1.2 | 0.2 | 4.6 |

[1] Includes 0.1 g. octafluorocyclohexa-1:4 diene, formed by isomerisation.

TABLE 2.—DEHALOGENATIONS OVER FERROUS FLUORIDE

| Example No. | Vol. $FeF_2$ Pellets (mls.) | Compound Dehalogenated | Wt. in (g.) | Temp. (° C.) | Contact Time (mins.) |
|---|---|---|---|---|---|
| 4 | 360 | Octafluorocyclohexadienes (25% 1:3 isomer) | 14.1 | 420 | 6 |
| 5 | 380 | Perfluorodecahydronapthalene 94% | 4.6 | 450 | 23 |
| 6 | 380 | Perfluoromethylcyclohexane | 4.4 | 500 | 19 |
| 7 | 380 | Perfluoro-1:4-dimethyl cyclohexane | 4.5 | 500 | 20½ |
| 8 | 150 | 1,2,4-trichlorohepta fluorocyclohexene 96% | 1.9 | 400 | 20½ |
| 9 | 150 | 1,2-dichlorooctafluorocyclohexene 98% | 2.2 | 450 | 14 |
| 10 | 150 | Trichlorononafluorocyclohexane | 2.6 | 450 | 13½ |
| 11 | 150 | 1,2-dichloro-1,1,2-trifluoroethane | 5.0 | 450 | 4 |

| Example No. | Wt. Organic Products (g.) | | | | | | | |
|---|---|---|---|---|---|---|---|---|
| | Starting Materials | Unidentified Compounds | $C_6F_6$ | $C_6HF_5$ | Perfluoronaphthalene | $C_6F_5CF_3$ | Perfluoro-p-xylene | Total |
| 4 | 1:3, 0.3 / 1:4, 0.2 | 0.6 | 10.0 | 0.2 | | | | 11.3 |
| 5 | 1.2 | 0.3 | | | 1.4 | | | 2.9 |
| 6 | 2.0 | 0.3 | | | | 0.7 | | 3.0 |
| 7 | 0.8 | 0.1 | | | | | 1.4 | 2.3 |

| | | | $C_6ClF_5$ | $o$-$C_6Cl_2F_4$ | $C_6Cl_3F_3$ | $C_2HF_3$ | |
|---|---|---|---|---|---|---|---|
| 8 | 0.3 | 0.1 | | 0.7 | 0.1 | | 1.2 |
| 9 | 1.0 | 0.2 | | 0.3 | 0.1 | | 1.6 |
| 10 | | 0.3 | 0.7 | 0.1 | 0.2 | | 1.3 |
| 11 | 1.2 | 0.3 | | | | 0.9 | 2.4 |

*Example 11*

0.64 g. of octafluorocyclohexadienes (45% 1:3 isomer) vapour entrained in nitrogen was bubbled through molten stannous fluoride contained in a recrystallised alumina tube closed at one end and fitted with a dip pipe of the same material. The tube was mounted vertically in a furnace heated to 590° C. and contained approximately 250 g. of $SnF_2$. The organic product obtained consisted of recovered octafluorocyclohexadienes (0.14 g.), decafluorocyclohexene (0.15 g.) and hexafluorobenzene (0.19 g.).

Note: The formation of decafluorocyclohexene is due to a disproportionation reaction:

$$2C_6F_8 \rightarrow C_6F_6 + C_6F_{10}$$

proceeding concurrently with the defluorination reaction:

$$C_6F_8 + SnF_2 \rightarrow SnF_4 + C_6F_6$$

We claim:

1. A process for the preparation of a highly fluorinated compound containing double-bond unsaturation, comprising the essential step of contacting a fluorine-containing highly halogenated organic compound selected from the group consisting of aliphatic chlorofluorocarbon, aliphatic chlorofluorohydrocarbons, fluoro- and chlorofluoro-cyclohexanes, fluoro- and chlorofluoro-cyclohexenes, fluoro- and chlorofluoro-cyclohexadienes, perfluorodecahydronaphthalene, and perfluoroethylbenzene in the vapour phase at a temperature in the range 200° C.–700° C. with at least one initially present metal fluoride selected from the group consisting of chromous fluoride, ferrous fluoride and stannous fluoride which is capable of acting as a strong reducing agent in order to dehalogenate the said fluorine-containing highly halogenated organic compound.

2. A process as claimed in claim 1, in which dehalogenation is carried out at between 300° C. and 600° C.

3. A process as claimed in claim 1, in which the aliphatic chlorofluorocarbon 1,1,2 trichloro-trifluoroethane is dechlorinated.

4. A process as claimed in claim 1, in which the aliphatic chlorofluorohydrocarbon compound 1,2 dichloro-1,1,2-trifluoroethane is dechlorinated.

5. A process as claimed in claim 1, in which a chlorofluorocyclohexane containing from 1 to 6 chlorine atoms is dehalogenated to give a highly fluorinated chlorofluorobenzene.

6. A process as claimed in claim 1, in which perfluoronaphthalene is prepared by defluorination of perfluorodecahydronaphthalene.

7. A process as claimed in claim 1 in which the highly halogenated organic compound is perfluoromethylcyclohexane.

8. A process as claimed in claim 1 in which the highly halogenated organic compound is perfluoroethylcyclohexane.

9. A process as claimed in claim 1 wherein octafluorostyrene is prepared by the defluorination of perfluoroethylbenzene.

10. The process of claim 1 wherein the initially present fluoride is liquid stannous fluoride and the highly halogenated organic compound is a fluorinated cyclohexadiene and the product contains double bond unsaturation.

11. A process for the preparation of a highly fluorinated benzene comprising the essential step of contacting a highly fluorinated cyclohexadiene containing vinylic hydrogen atoms only in the vapour phase at a temperature in the range 200° C.–700° C. with at least one initially present metal fluoride selected from the group consisting of chromous fluoride, ferrous fluoride and stannous fluoride and which is capable of acting as a strong reducing agent in order to defluorinate the said compound.

12. A process as claimed in claim 11, in which tetrafluorobenzene is prepared by defluorination of a hexafluorocyclohexadiene.

13. A process as claimed in claim 11, in which pentafluorobenzene is prepared by defluorination of a heptafluorocyclohexadiene.

14. A process as claimed in claim 11 in which hexafluorobenzene is prepared by defluorination of octafluorocyclohexadiene.

15. A process for the preparation of a highly fluorinated benzene comprising the essential step of contacting a highly fluorinated cyclohexene containing vinylic hydrogen atoms only in the vapor phase at a temperature in the range 200° C.–700° C. with at least one initially present metal fluoride selected from the group consisting of chromous fluoride, ferrous fluoride and stannous fluoride and which is capable of acting as a strong reducing agent in order to defluorinate the said compound.

16. A process for the preparation of a highly fluorinated compound containing double-bond unsaturation, comprising the essential step of (A) contacting a fluorine-containing highly halogenated organic compound selected from the group consisting of aliphatic chlorofluorocarbon, aliphatic chlorofluorohydrocarbons, fluoro- and chlorofluorocyclohexanes, fluoro- and chlorofluoro-cyclohexenes, fluoro- and chlorofluoro-cyclohexadienes, perfluorodecahydronaphthalene, and perfluoroethylbenzene in the vapour phase at a temperature in the range 200° C.–700° C. with at least one solid metal fluoride which is capable of acting as a strong reducing agent in order to dehalogenate the said fluorine-containing highly-halogenated organic compound, and (B) regenerating the metal fluoride by reduction with hydrogen gas.

17. A process as claimed in claim 16, in which regeneration is carried out in a flow system between 400° C. and 700° C.

18. A process as claimed in claim 16, in which a regeneration stage follows a dehalogenation stage.

19. A process as claimed in claim 18, in which regeneration comprises a reduction stage and a hydrogen fluoride treatment to eliminate chlorine and give the metallic fluorides.

References Cited by the Examiner
UNITED STATES PATENTS

| | | | |
|---|---|---|---|
| 2,697,124 | 12/1954 | Mantell | 260—653.5 |
| 3,000,976 | 9/1961 | Patrick et al. | 260—650 |
| 3,004,077 | 10/1961 | Banks et al. | 260—650 |

LEON ZITVER, *Primary Examiner.*

K. H. JOHNSON, K. V. ROCKEY, *Assistant Examiners.*